United States Patent [19]

Bossier, III et al.

[11] Patent Number: 4,847,061
[45] Date of Patent: Jul. 11, 1989

[54] PROCESS FOR PREPARATION OF SILANE

[75] Inventors: Joseph A. Bossier, III, Greenwell Springs, La.; Douglas M. Richards, Houston; Lloyd T. Crasto, Humble, both of Tex.

[73] Assignee: Ethyl Corporation, Richmond, Va.

[21] Appl. No.: 75,367

[22] Filed: Jul. 20, 1987

[51] Int. Cl.$^4$ .................. C01B 33/04; C01B 9/00; C01F 3/00; C01D 3/00
[52] U.S. Cl. .................. 423/347; 423/463; 423/495; 423/499; 423/DIG. 5; 423/DIG. 6
[58] Field of Search .............. 423/347, 463, 495, 499, 423/DIG. 5, DIG. 6

[56] References Cited

U.S. PATENT DOCUMENTS

| | | | |
|---|---|---|---|
| 4,407,783 | 10/1983 | Ulmer | 423/347 |
| 4,601,798 | 7/1986 | Jacubert et al. | 204/61 |
| 4,632,816 | 12/1986 | Marlett | 423/347 |

FOREIGN PATENT DOCUMENTS 823496  11/1959  United Kingdom.
851962  10/1960  United Kingdom.
909950  11/1962  United Kingdom.

OTHER PUBLICATIONS

Wherry et al, Process Instrumentation Manual.
Padam, J. of Fluorine Chemistry 14 (1979) 327-329.

Primary Examiner—John Doll
Assistant Examiner—Lori S. Freeman
Attorney, Agent, or Firm—John F. Sieberth; Philip M. Pippenger

[57] ABSTRACT

A continuous method for preparing silane and a co-product by reacting a metal hydride such as $NaAlH_4$ with a silicon halide such as $SiF_4$. The method involves a reactor loop comprising a primary reactor, a secondary reactor and a separation zone. Most of the metal hydride is reacted in the first reactor to which it is added in a substantially constant rate. The remainder of the hydride is reacted in the secondary reactor, in which all or substantially all of the silicon halide is added. The rate of silicon halide addition is governed by feed back from the reaction in the secondary reactor, ($\leftarrow$T so that stoichiometric or substantially stoichiometric operation is achieved. This conserves resources, provides improved co-product and reduces costs.

17 Claims, 2 Drawing Sheets

PROCESS FOR PREPARATION OF SILANE

CROSS REFERENCE TO RELATED PATENT

Reference is made to U.S. Pat. No. 4,632,816, issued Dec. 30, 1986, in the name of E. M. Marlett. That patent and this application are commonly assigned

BACKGROUND OF THE INVENTION

1. Field of the Invention

This invention pertains to the preparation of silane. More particularly it relates to the reaction of a metal hydride with a silicon halide to produce silane and one or more co-products. In a preferred embodiment it relates to the reaction of silicon tetrafluoride with an alkali metal aluminum hydride selected from $LiAlH_4$, $NaAlH_4$ and $KAlH_4$.

Furthermore, this invention relates to a continuous method of preparing silane from a metal hydride and a silicon halide. With the method of this invention, stoichiometric, or substantially stoichiometric operation can be achieved. Furthermore, this invention can produce a fluoride-containing co-product that is free or substantially free of metal hydride starting material. This is an important feature of the invention.

2. Description of the Prior Art

Applicants are unaware of any prior art that describes the continuous, stoichiometric or virtually stoichiometric process described herein, or that describes application of the method to the production of silane from a silicon halide and a metal hydride.

Chemical reactions for the preparation of silane from metal hydrides are known in the art:

(1) $LiAlH_4 + SiCl_4 \longrightarrow SiH_4 + LiCl + AlCl_3$
Kelly, British 823,496.

(2) $NaAlH_4 + SiCl_4 \longrightarrow SiH_4 + NaCl + AlCl_3$
Allied, British 851,962.

(3) $3SiF_4 + 4NaH \longrightarrow SiH_4 + 2Na_2SiF_6$
Ulmer, U.S. Pat. No. 4,407,783.

(4) $SiH_{4-x}Cl_x + xLiH \longrightarrow silane + LiCl$
Jacubert et al, U.S. Pat. No. 4,601,798.

(5) Reaction of hydrides such as sodium hydride and lithium hydride with halosilanes, using a zinc catalyst.
DuPont, British 909,950.

(6) Reaction of $SiF_4$ and $LiAlH_4$.
Padma, J. of Fluorine Chemistry 14 (1979) 327–329.

In addition to the reactions disclosed in the literature cited above, E. M. Marlett (see U.S. Pat. No. 4,632,816, supra) discovered the reaction:

(7) $5NaAlH_4 + 5SiF_4 \longrightarrow Na_5Al_3F_{14} + 2AlF_3 + 5SiH_4$

In a highly preferred embodiment, the instant invention is applied to enhance the Marlett Process.

SUMMARY OF THE INVENTION

This invention comprises a continuous method for the formation of silane by the reaction of a silicon halide with a metal hydride. The method of this invention also comprises a stoichiometric or substantially stoichiometric reaction of the silicon halide and the metal hydride. The method comprises conducting the reaction in a loop system that comprises two reaction zones and a separation zone. One of the reaction zones (primary reactor) is preferably larger than the other (secondary reactor), and most of the reaction is preferably conducted in the primary reactor. Preferably, metal hydride is continuously added at a substantially constant rate and in stoichiometric excess to the primary reactor, and in the secondary reactor, silicon halide is continuously added in stoichiometric excess to the hydride present in that reactor. During or after the excess metal hydride in the effluent from the first reactor is contacted with the silicon halide in the second reactor, the fluoride containing reaction co-product is separated. The exposure of the minor amount of metal hydride contained in the effluent from the first reactor, with the large amount of silicon halide introduced in the second reaction zone, helps insure that the solid fluoride-containing co-product is free, or substantially free, of metal hydride starting material. This is a key feature of the invention since it enhances the purity (and/or the utility) of the co-product. When the co-product is separated, it is usually removed along with liquid(s) employed as the reaction medium. The liquid(s) can be separated from the solid co-product, and if desired, the separated liquid material can be recycled.

Since metal hydride is reacted with silicon halide in the secondary reactor, heat is produced in the second reaction zone. The difference in temperature ($\Delta T$) between the primary reactor effluent entering the secondary reactor, and the reaction mass inside the secondary reactor, is used to generate a signal; that signal is employed to continuously adjust the flow of silicon halide to the secondary reactor. This continuous adjustment results in stoichiometric or substantially stoichiometric operation.

As stated above, this invention is admirably suited for use with the silane preparation method discovered by E. M. Marlett, supra; most preferably with the reaction of $NaAlH_4$ and $SiF_4$ depicted by equation (7) above. (Marlett's invention also comprises the reaction of $KAlH_4$ with $SiF_4$. However the sodium analog of $KAlH_4$ is less expensive, and therefore its use in the instant invention is preferred.)

A key feature of the Marlett process is that it readily forms silane from $SiF_4$ and $NaAlH_4$. Another key feature is the low level of organic impurity in the fluoride-containing, solid co-product ($Na_5Al_3F_{14}\cdot 2AlF_3$). (For purposes of this invention, this product can be considered to be $NaAlF_4$.) Because the organic content is low, the co-product can be used as an additive in the Hall aluminum process, i.e. as an additive to the Hall cell to adjust the Na-to-F ratio. If the level of organics in the co-product was high, utility in the Hall cell would be lessened or made non-existent. This is because Hall cells are operated at high temperatures and the environment therein is rigorous. Consequently, if the level of organics in an additive is too high, dangerous fires can occur if the additive is added to a Hall cell while the cell is in operation. Therefore, the level of organics must be kept low.

Likewise, the $NaAlH_4$ content (of the Marlett co-product) must also be kept low in order to enhance utility of the co-product as an additive for aluminum production. If the $NaAlH_4$ content is too high, dangerous fires might occur in the Hall cell, caused by ignition and burning of hydrogen released from the metal hydride. Fortunately, application of the process of the instant invention to the Marlett process produces a coproduct having a very low level of NaAlH$_4$ contained therein. As stated above, this is a key feature of the instant invention. Sodium aluminum hydride is virtually impossible to separate from the fluoride containing co-product. Hence, co-product contaminated with too much NaAlH$_4$ is not only unsuitable for Hall cell use, but it cannot be economically upgraded for that use, by known means.

A skilled practitioner will recognize that the lithium-fluorine co-product—that is produced by reaction of silicon tetrafluoride and lithium aluminum hydride—might also be useful in the Hall process if the organic and hydride impurity levels are low enough. This is so because lithium is used with fluorine in the production of aluminum. Experimentation by applicants' co-worker E. M. Marlett has shown that the organic level of the lithium-aluminum-fluoride co-product is low; although not as low as in the analogous sodium containing co-product produced under similar conditions. However, in view of the low level of organic impurity, the process of the instant invention will make an attractive lithium-aluminum-fluoride co-product when applied to the process comprising reaction between SiF$_4$ and LiAlH$_4$. Moreover, the heat of reaction between SiF$_4$ and LiAlH$_4$ is high enough for this invention to be used, and thereby improve the process of reacting those two substances.

Generally speaking, the reactions of metal hydrides with halosilanes are characterized by high heats of reaction. Hence, the process of this invention is widely applicable to upgrade such reactions when it is desired to react such materials in a stoichiometric or substantially stoichiometric, continuous procedure to avoid contamination of the solid co-product with the solid starting material. Hence, for example, the process of this invention can be used to react NaAlH$_4$ or LiAlH$_4$ with SiCl$_4$ or SiF$_4$ to produce silane and a halogen-containing co-product.

DESCRIPTION OF PREFERRED EMBODIMENTS

This invention comprises a continuous method for preparing silane and a co-product comprising a metal and a halogen, said process comprising:

(A) reacting in a first reaction zone and in a liquid reaction medium, a metal hydride preferably selected from alkali metal hydrides and alkali metal aluminum hydrides, with less than a stoichiometric quantity of a silicon halide selected from compounds having the formula SiX$_4$, wherein X is fluorine, chlorine, or bromine;

(B) reacting in a second reaction zone, metal hydride remaining in the liquid/solid reaction product produced by step A, with a quantity of SiX$_4$ in excess of that required to react with said remaining metal hydride;

(C) separating in a separation zone, a gaseous fraction comprising silane and unreacted silicon halide from solid reaction product suspended in diluting solution and produced in said reaction zones;

(D) recovering said silane;

(E) introducing unreacted silicon halide from said second reaction zone into said first reaction zone to react with an additional quantity of metal hydride;

(F) determining the difference in temperature between the temperature of reaction liquid in said second reaction zone, and the temperature of reactant liquid substantially immediately prior to entry into said second zone; and (G) utilizing a signal derived from said difference in temperature to regulate the flow of silicon halide to the second reaction zone and thereby achieve stoichiometric or substantially stoichiometric reaction of the total amounts of silicon halide and metal hydride reacted in both reaction zones.

In highly preferred embodiments, the metal hydride is an alkali metal hydride NaH and LiH or an alkali metal aluminum hydride selected from LiAlH$_4$, NaAlH$_4$ and KAlH$_4$, and the silicon halide is SiF$_4$ or SiCl$_4$. For the purpose of this invention, SiI$_4$ and SiBr$_4$ are considered equivalents to the SiF$_4$ and SiCl$_4$ reactants. Also, mixed silicon halides, wherein at least two halogens are present, are also considered equivalents of the SiX$_4$ reactants. Such equivalents are illustrated by SiBr$_2$Cl$_2$, SiF$_2$Cl$_2$, SiFCl$_2$Br, SiF$_2$ClBr, and the like. For purposes of this invention other metal hydrides such as MgH$_2$ and Ca(AlH$_4$)$_2$ are considered equivalents of the metal hydrides mentioned above.

Figure 2:
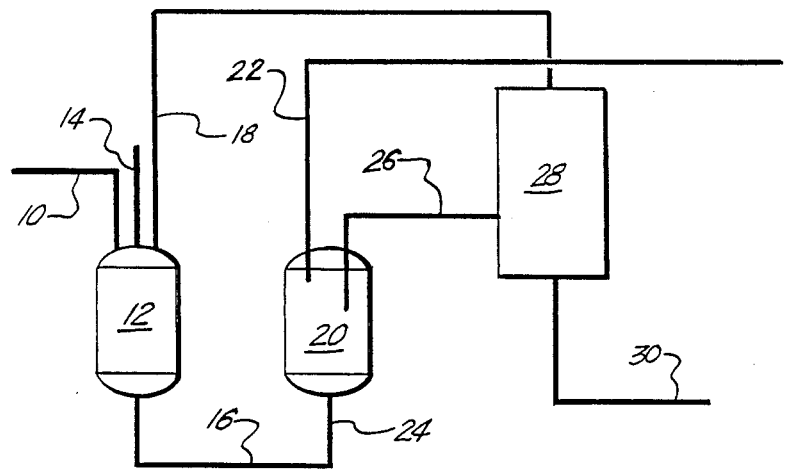
FIG. 2 is a schematic drawing, not to scale, of a reactor loop system that can be used to conduct the process of this invention.

This invention also comprises the reaction loop utilized to conduct the process. Referring to FIG. 2, sodium aluminum hydride in a solution is taken from a source thereof (not shown), and introduced via line 10 into reaction vessel 12, the primary reaction vessel. That vessel may be made of carbon steel or other suitable substance. In a preferred embodiment, the NaAlH$_4$ is admixed with a hydrocarbon such as toluene, and an ether such as diglyme, or monoglyme (dimethoxyethane, DME). Reaction vessel 12 is fitted with a stirrer (not shown), silane exit means 14, and slurry exit means 16. Moreover, vessel 12 is also fitted with fluid entry means 18, through which SiF$_4$ is introduced.

The streams introduced via lines 10 and 18 are admixed in vessel 12, and the NaAlH$_4$ and SiF$_4$ so introduced are caused to react. To enhance mixing the reactants, SiF$_4$ can be sparged into the liquid containing the NaAlH$_4$. By state-of-the-art temperature regulating means (not shown), the reaction temperature is maintained between about 10° C. and 80° C.; preferably between about 30° and about 60° C.

By-product effluent containing metal-aluminum-fluoride co-product is removed from the reaction vessel via line 16. This effluent contains fluoride-containing by-product (Na$_5$Al$_3$F$_{14}$+2AlF$_3$, or NaAlF$_4$) and liquid reaction medium. It also contains some unreacted NaAlH$_4$, since the process is purposely conducted so that less than an equimolar amount of SiF$_4$ is introduced into vessel 12. From about 90% to 99% by weight of the NaAlH$_4$ is reacted in that vessel.

More preferably, from about 95-99% of the NaAlH$_4$ is reacted in the primary reaction vessel. In general, it is desirable (a) to react most of the NaAlH$_4$ in that vessel, with the proviso that (b) enough NaAlH$_4$ is reacted in the secondary vessel to give a temperature increase in that vessel which will provide (c) a $\Delta T$ high enough to generate a sufficiently sensitive signal to (d) regulate the flow of SiF$_4$ with enough precision in order to (e) achieve stoichiometric, or substantially stoichiometric reaction.

As shown in FIG. 2, slurry from vessel 12 enters secondary vessel 20 via an extension of line 16. Vessel 20 can also be made of carbon steel or other similar substance. The vessel can be considerably smaller in capacity than the primary reaction vessel; for example if vessel 12 is about 45 gallons (~170 liters) then vessel 20, can be about 10 gallons (~38 liters). In vessel 20, the slurry is contacted at reaction temperature (see above) with SiF$_4$ introduced into the vessel through line 22. The amount (i.e. the rate) of SiF$_4$ introduced is controlled in order to be stoichiometrically equal to the amount of NaAlH$_4$ introduced into reactor 12 via line 10. At any given instant, the reaction system may be somewhat out of stoichiometry, but over time with sufficient iterations about the reaction loop, stoichiometry or near stoichiometry is achieved. As stated above, the $\Delta T$ between the liquid temperature inside vessel 20 and the liquid temperature upstream thereof at a point 24 (inside line 16) is used to generate a signal to regulate SiF$_4$ flow. The signal can open or close valve means (not shown) in line 22 to increase or decrease the amount of SiF$_4$ introduced into vessel 20. The temperature measurements inside and outside the reactor, i.e. in vessel 20 and in line 16 can be determined by any suitable means such as a resistance temperature detector (RTD).

From vessel 20, material flows through line 26 into separation zone 28. In that zone, silane and unreacted SiF$_4$ plus other gaseous material(s) if present, are separated from the solid reaction product (Na$_5$Al$_3$F$_{14}$ +2AlF$_3$, or NaAlF$_4$). The solid product is removed via line 30 for further processing. The gaseous material is transported via line 18 into vessel 12 thereby closing the loop. Silane is collected via line 14.

A skilled practitioner will recognize that pump means are used to move the streams as described; these need not be shown since they are within the art.

One of the features of this invention is that the sodium aluminum hydride employed in the embodiment being described need not be pure. It can be used in the mixture produced by reacting aluminum and sodium (or sodium hydride) with hydrogen under pressure and in the presence of an aluminum alkyl catalyst and a hydrocarbon medium such as toluene. Thus, NaAlH$_4$ starting material can be made in general accordance with one or the other methods of Ashby; U.S. Pat. Nos. 4,045,545, 4,081,524. Other methods are known: for example, U.S. Pat. Nos. 4,528,176, and 4,529,580. The following example is illustratively typical of considerable operating experience gained while developing this invention. The reaction vessels had about the dimensions given above (170 and 38 liters). They were equipped in general accordance with the embodiment illustrated by FIG. 2. The sodium aluminum hydride feed stream is 14% sodium aluminum hydride, but it is diluted to 11% for conducting the reaction. The following examples illustrate the invention but do not limit it.

EXAMPLE 1

(I) Bases:
(1) Feed rate of SiF$_4$ to secondary reaction vessel is 70 pounds per hour (31.8 kg per hour)
(2) Analysis of sodium aluminum hydride solution used as starting materials:

| | |
|---|---|
| 14% | sodium aluminum hydride |
| 0.85% | NaAl(C$_2$H$_5$)$_2$H$_2$ (OMH-1) |
| 0.60% | Na$_3$AlH$_6$ |
| 0.20% | aluminum metal |

(3) 98.5% of NaAlH$_4$ reacts in primary reactor; balance in secondary reactor.
(4) All OMH-1 reacts in secondary reactor.
(5) 1 mole of SiF$_4$ reacts with 2 moles of OMH-1.
(6) SiH$_4$ Product contains 1.5 mole % H$_2$, 13,000 ppm C$_2$H$_5$SiH$_3$ (mole basis), 10,000 ppm C$_2$H$_6$ (mole basis).
(7) Neglect any DME decomposition and DME leaving entrained with SiH$_4$.
(8) 70 pounds per hour (31.8 kg/hr) SiF$_4$ feed rate.
(9) molecular weights:

| | |
|---|---|
| Silane | 32 |
| SiF$_4$ | 104 |
| NaAlH$_4$ | 54 |
| NaAl(C$_2$H$_5$)$_2$H$_2$ | 110 |
| C$_2$H$_5$SiH$_3$ | 60 |

(II) Calculation of hydrides reacted per hour

Let x = pounds per hour SiF$_4$ react with NaAlH$_4$
Let y = pounds per hour SiF$_4$ react with OHM-1

$$\text{NaAlH}_4 = \frac{54(x)}{104} = 0.5192x$$

$$\text{OMH-1} = \frac{2 \times 110(y)}{104} = 2.1154y$$

$$\frac{\text{NaAlH}_4}{\text{OMH-1}} = \frac{.5192x}{2.1154y} = \frac{14}{0.85}$$

$$\frac{x}{y} = 67.1069$$

x + y = 70
    = 70 pounds SiF$_4$ per hour or 31.8 kg per hour
67.1069y + y = 70
68.1069y = 70
y = 1.02 pounds per hour or 0.46 kg/hour
x = 70.0 − 1.02 = 68.98 pounds per hour or 31.4 kg/hour (III) Calculation of amount of solution to be utilized per hour at 11% dilution $$\text{NaAlH}_4 \text{ solution} = \frac{(0.5192)(68.98)}{0.11}$$

=325.6 lbs per hour, or 148 kg per hour
NaAlH$_4$ = (0.5192)(68.98) = 35.8 lbs per hour, or 16.3 kg per hour $$\text{NaAlH}_4 \text{ feed solution} = \frac{(0.5192)(68.98)}{0.14}$$

= 255.8 pounds per hour or 116.3 kg/hour (IV) Calculation of amount of diluent required per hour Diluting solution required = 325.6 − 255.8
   = 69.8 lbs per hour
   = 31.7 kg per hour

| (V) | Sum of Materials Added | Pounds/hour | Kg/hour |
|---|---|---|---|
| | SiF$_4$ | 70 | 31.8 |
| | NaAlH$_4$ solution | 255.8 | 116.3 |
| | Diluting solution | 69.8 | 31.7 |
| | | 395.6 | 179.8 |

(VI) Solvent in NaAlH$_4$ feed
255.8 × [1.00 − (0.14 + 0.0085 + 0.006 + .002)] = 215.8 lbs/hr or 98.1 kg/hr (VII) Gaseous Products $$\text{Amount of SiH}_4 \text{ produced} = \frac{(0.5192)(68.98) \times 32}{54}$$

-continued

= 21.2 lbs per hour or 9.6 kg per hour $$C_2H_5SiH_3 \text{ produced} = 60 \times \frac{21.2}{32} \times \frac{13,000}{10^6} \times \frac{1}{0.962}$$

= 0.54 lbs/hr or 0.24 kg/hr

[The factor (1/0.962) takes into account the molar purity of $SiH_4$ relative to $H_2$, $C_2H_6$, and ethyl silane.]

$$C_2H_6 \text{ produced} = 30 \times \frac{21.2}{32} \times \frac{10,000}{10^6} \times \frac{1}{0.962}$$

= 0.21 lbs/hr or 0.08 kg/hr $$H_2 \text{ produced} = 2 \times \frac{21.2}{32} \times \frac{15,000}{10^6} \times \frac{1}{0.962}$$

= 0.02 lbs/hr or 0.01 kg/hr

| Sum of Gaseous Products Produced | lbs/hour | kg/hour |
|---|---|---|
| silane | 21.2 | 9.6 |
| hydrogen | 0.02 | 0.01 |
| $C_2H_5SiH_3$ | 0.54 | 0.24 |
| $C_2H_6$ | 0.21 | 0.09 |
| | 22.0 | 10 kg |

(VIII) Amount of Slurry Produced (by difference)
materials in − gases out = slurry produced
395.6 − 22 = 373.6 pounds per hour or 169.8 kg/hr
(IX) $NaAlH_4$ and $SiF_4$ Reactants
Amount of $NaAlH_4$ reacting in primary reactor
35.8 × 0.985 = 35.3 lbs/hr or 16.0 kg/hr
Amount of $NaAlH_4$ reacting in secondary reactor
35.8 − 35.3 = 0.5 lbs/hr or 0.22 kg/hr
Amount of $SiF_4$ reacting in secondary reactor

| OMH-1 (see II above) | 1.0 lbs/hr | 0.45 kg/hr |
| $NaAlH_4$ = 68.98 = 0.015 | 1.0 lbs/hr | 0.45 kg/hr |
| | 2.0 lbs/hr | 0.9 kg/hr |

(X) Amount of $SiF_4$ to primary reactor
69.3 − 2.04 = 68 lbs/hr or 30.9 kg/hr
(XI) Amount of $(NaAlF_4)$ produced from $NaAlH_4$ $$35.8 \times \frac{126}{54} = 83.5 \text{ lbs/hr or } 38.0 \text{ kg/hr}$$

Figure 1:
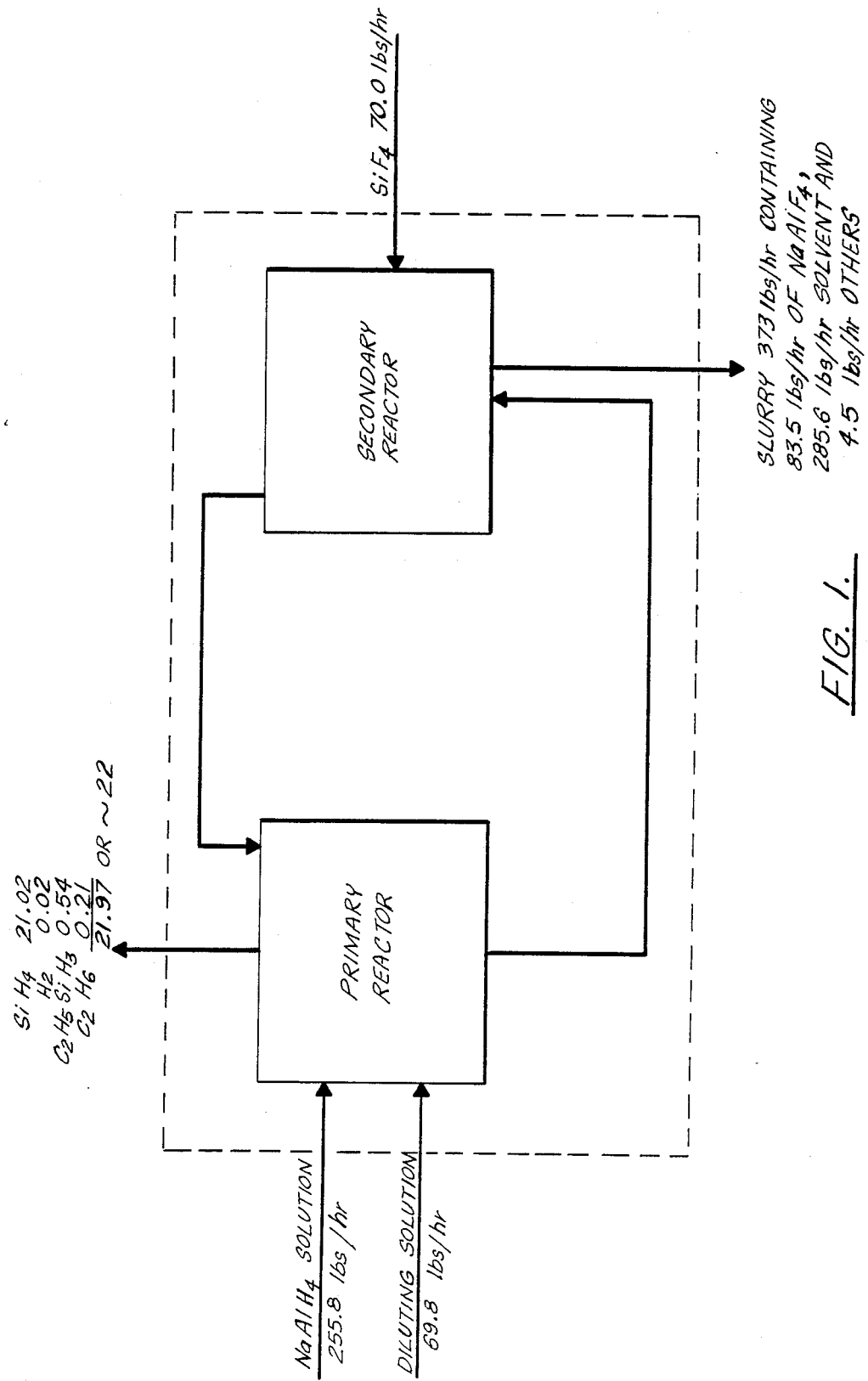
FIG. 1 is a schematic representation of an embodiment of this invention. It shows two reaction zones, one of which is primary and the other secondary. It shows that a stream of sodium aluminum hydride enters the primary reactor, and SiF$_4$ the other reactor. The drawing has an overall material balance obtained when the system is operating stoichiometrically under a given set of conditions that illustrates the process of this invention; (Example 1).

(XII) Solvents leaving primary reactor
215.8 + 69.8 = 285.6 lbs/hr or 129.8 kg/hr The above calculations, which are summarized in FIG. 1, illustrates the process of this invention applied to an embodiment of the Marlett invention, i.e. the reaction summarized by equation (7) above. In this example, the sodium aluminum hydride employed was not pure; rather, it was contained in a mixture which comprised toluene, aluminum, OMH-1 and $Na_3AlH_6$. This mixture was formed by reacting sodium, aluminum, and hydrogen under high pressure and in the presence of toluene as a reaction medium and triethyl aluminum as a catalyst. The slurry also contained dimethoxyethane which is used to solubilize the reactants $NaAlH_4$ and $SiF_4$. The process of the example can encompass use of reactants that contain extraneous materials. For example, the $SiF_4$ need not be pure but can contain about 1% HCl. Of course, purer reactants than those used in the example may be employed if desired. Likewise the process need not contain $NaAlH_4$ in toluene. Thus for example, the $NaAlH_4$ can be admixed with one or more of the other hydrocarbons disclosed in the Ashby patents, supra. As appreciated by a skilled practitioner it is good practice to keep the $NaAlH_4$ under an inert liquid such as a hydrocarbon since the hydride is reactive to air and moisture. For the process of the example, the 14% mixture of $NaAlH_4$ used as a stock solution was diluted prior to entry into the reaction zone by mixing with additional DME/toluene mixture in order to bring the reaction mixture to a concentration of 11%.

It was found that in the equipment used to conduct the process of the invention, that operation at an $NaAlH_4$ concentration of 8–12 percent helped alleviate some pluggage problems in the lines. Obviously, the concentration of the reactants is an important, but not a critical factor of the invention. For example, it is possible to run at an $NaAlH_4$ concentration of 4–6%.

The primary and secondary reactors had a capacity of about 45 and 10 gallons, respectively. This relative size is not critical. Both reactors are stirred; vigorous stirring helps diminish plugging problems.

The reaction was conducted so that 98.5% of the $NaAlH_4$ reacted in the first reactor. It is not necessary to use this fractional amount; more or less $NaAlH_4$ can be reacted as desired, so long as the heat of reaction in the secondary reactor is high enough to produce a $\Delta T$ sufficient to generate a signal that can accurately govern the flow of $SiF_4$. Under the conditions in the example about 87,500 BTU were generated per hour. Of this heat, about 2200 BTU were generated in the secondary reactor. This was sufficient to allow use of the RTDs employed to determine the relative temperatures in the reactor and upstream thereof and to generate a means to vary the flow of $SiF_4$ to the secondary reactor. The application of the use of the $\Delta T$ to adjust $SiF_4$ flow is within the skill of the art.

The reaction of $SiF_4$ with OMH-1 is slower than with $NaAlH_4$, and for this example it appears that practically all of the OMH-1 reacts in the secondary reactor. Under the conditions employed, where 98.5% of the $NaAlH_4$ reacts in the primary reactor, the OMH-1 is exposed to a relatively great deal of $SiF_4$ in the secondary reactor. It appears that these operating conditions cause all or about all of the OMH-1 to react to yield products other than $SiH_4$. Evidence indicates that if the relative $SiF_4$ concentration is reduced, say by reacting more $NaAlH_4$ in the secondary reactor, the amount of $SiH_4$ produced from OMH-1 may increase. The amount of $Na_3AlH_6$ present in the reaction mixture is low enough that the gaseous products produced therefrom can be ignored, if the process is conducted as in the example.

The process of the above example can be modified by using one or more of the following as a replacement for $SiF_4$: $H_3SiF$, $H_2SiF_2$, $HSiF_3$, $H_3SiCl$, $H_3SiBr$, $H_2SiCl_2$, $SiCl_2F_2$, $SiClF_3$ and $SiBrF_3$.

The slurry product produced by the invention can be dried to remove solvent (toluene plus DME). After removal of the solvent by any suitable technique known in the art, the product can be ground or compacted to a desired size. The product contains little or no $NaAlH_4$ and the amount of solvent complexed with the product (and therefore not readily removed by heating the wet product) is low. Consequently the product is in a form suitable for use in Hall electrolytic cells.

The process of this invention can be used to prepare silane suitable for use as a source of electronic grade silicon. For this purpose, the silane produced by the method of this invention can be subjected to further purification. Silane can be purified by many known techniques, for example cryogenic distillation, pressure distillation, selective absorption, large scale gas chromatography and similar techniques; confer U.S. Pat. Nos. 3,019,087; 3,041,141; 3,491,517; 4,554,141 and 4,537,759.

To aid contacting the reactants, the $SiF_4$ *is preferably sparged into an agitated solution of the $NaAlH_4$* using vigorous stirring to aid disposal of $SiF_4$ into the body of the liquid. Preferably, the liquid contains sufficient ether such as DME to assist the solubilization of the $NaAlH_4$ to the extent necessary for the reaction to take place under the conditions employed.

In the above example, the relative amount of dimethoxyethane and toluene in the mixture employed was about 3.6 to 1. It is not necessary to use that relative concentration. For example, toluene can be wholly absent. When it is employed, the relative concentration is not critical but for physical limitations is kept below about 30%. The toluene arises from its use in the preparation of the $NaAlH_4$ and need not be separated from the reaction mixture thereby produced. The amount of DME used is enough to appropriately dissolve the $NaAlH_4$.

As stated above, the fluoride containing product is $Na_5Al_3F_{14} \cdot 2AlF_3$ which net, is equal to $NaAlF_4$. The product can be separated from the liquid materials by drying. The separated solvent(s) can be recovered and recycled.

The ether reaction medium can be selected from those named and described in E. M. Marlett application Ser. No. 701,947, supra. That application is incorporated by reference herein as if fully set forth.

Thus the liquid media include the polyethers such as the dimethyl ether of diethylene glycol (diglyme), the dimethyl ether of ethylene glycol (monoglyme), the dimethyl ether of triethylene glycol (triglyme), the dimethyl ether of tetraethylene glycol (tetraglyme), 1,4-dioxane, and 1,3-dioxolanes, and tetrahydrofuran (THF).

Preferred liquid reaction mediums are the polyethers. These include 1,4-dioxane, 1,3-dioxolane, the diethyl ether of ethylene glycol, the dimethyl ether of ethylene glycol, the dimethyl ether of propylene glycol, the dimethyl ether of diethylene glycol, and the like.

A more preferred class of liquid reaction mediums are the di-loweralkyl ethers of alkylene glycols. These include the diethyl ether of ethylene glycol, the dimethyl ether of propylene glycol, the dimethyl ether of diethylene glycol, and the like.

Still more preferred are the di-loweralkyl ethers of ethylene glycols. These include the dimethyl ether of ethylene dimethyl ether of triethylene glycol, and the like. The diethyl ether of ethylene glycol is an advantageous reaction medium because the normal ether cleavage attributable to solvent attack does not produce methane. The dimethyl ether of ethylene glycol is the most preferred inert liquid reaction medium. Dimethoxypropane and the dimethyl ether of propylene glycol also work well.

The preferred solvents of the invention are those which provide reasonable solubility for hydride reactant such as sodium aluminum tetrahydride or potassium aluminum tetrahydride. Reaction media other than ethers can be used; other useful medium include tertiary amines such as triethylamine, tributylamine, N-methylpyrrolidine and mixtures of such liquids.

Liquid reaction media outside the preferred class of polyethers are also generally somewhat water-miscible. Hydrocarbons can be used, but when used alone they will provide low to moderate yields of silane unless very strong agitation is used.

Of the types of ethers that are mentioned, ethers that have the requisite solvent power and that are relatively low boiling materials are preferred. This is because hydrides such as $NaAlH_4$ are very reactive substances, and must be handled with care. In order to promote safety, it is better if the ether solvent be low boiling so that it can be readily separated from the reaction mixture to avoid dangerous conditions in case of a process upset.

As indicated above, dimethoxyethane (DME) has been shown to have the requisite solvent power, and it has a sufficiently low boiling point. For these reasons and because it is commercially available at an acceptable price, it offers promise as a reaction solvent. However, its use is not without some drawbacks. However, an important feature of this invention is that it provides means for substantially overcoming some of the drawbacks and allows DME to be used. For example, $NaAlH_4$ and DME mixtures can explode if the temperature gets too high and furthermore $NaAlF_4$ or other similar products can lower the decomposition temperature of this mixture. Moreover, silane and DME mixtures containing 30-70% silane are very flammable. In the process of this invention the $Na_5Al_3F_{14} \cdot AlF_3$ co-product is continually removed. This lowers the hazard inherent with its presence in $NaAlH_4$ mixtures. Secondly, the addition of the large excess of $SiF_4$ in the secondary reactor provides $SiF_4$ in the vapor space in the separation zone and eliminates the vapor explosion hazard with DME/silane mixtures. These are important features of the invention.

There are additional, important significant features of this invention. As stated above, $NaAlH_4$ is virtually impossible to separate from $NaAlF_4$ and consequently its content therein should be minimized or more preferably, substantially eliminated. This invention provides means for keeping the $NaAlH_4$ concentration in the co-product below unacceptable levels. Without the control mechanism provided by the invention, the $NaAlH_4$ would have to be very precisely added to the reaction vessel and this would require more costly means of addition, storage, and much more analytical support personnel time. Thus, this invention eliminates significant investment and operating expense. Moreover, as appreciated by a skilled practitioner, time consuming sampling and analytical procedures would be required if this invention were not used. As a result, analysis would be completed after a substantial time had elapsed. Since the results would not be received in real time, they would not necessarily depict current operation. Therefore, the process of this invention provides a greater degree of reaction control then would otherwise be available. It should also be appreciated by a skilled practitioner that the iterative, loop process provided by this invention also provides a greater degree of stoichiometric control than could be afforded by any simple, single back-mix reactor of economically feasible size.

This invention provides means for making silane from $NaAlH_4$ on a scale heretofore unknown. It also provides commercially acceptable $SiH_4$ and co-product of high quality, under conditions of adequate safety. As indicated above, it also provides means for producing silane on a stoichiometric or a substantially stoichiometric basis that thereby conserves materials, eliminates costly separation techniques, and significantly reduces required chemical analysis, manpower and investment. In this invention, the preparative process itself is used as an analytical tool to control the input and usage of $SiF_4$ and $NaAlH_4$.

Furthermore, this invention allows the NaAlH$_4$ starting material to be used in the reaction mixture in which it is produced. Thus, the NaAlH$_4$ can be produced in toluene and then mixed with a DME/toluene mixture rich in DME before feeding to the reactor in which silane is produced. In short, this invention not only overcomes a set of very difficult technical hurdles, but it does so in a manner that provides many highly desirable advantages.

The reaction of NaAlH$_4$ and SiF$_4$, and similar reactions, carried out as illstrated by Example 1 can be conducted over a broad range of temperatures. A suitable range extends up to where cleavage of the liquid reaction medium, or other extraneous, undesirable side reaction occurs. Temperatures up to about 160° C. may be used. For reaction mixtures comprising ethers, a preferred range is about 0°–80° C. A more preferred range for ether solvents is about 10°–65° C., and a highly preferred range is about 20°–45° C. Operation should not be conducted above about 65° C. when using DME to avoid decomposition problems. Operation below about 10° C. may cause gelling problems.

The process may be conducted at, above, or below atmospheric pressure. An operable pressure range is from about one-half to 100 atmospheres (25–10,000 kPa). Atmospheric pressure is a convenient reaction pressure to use. Not much benefit is gained by using other reaction pressures since for example, the reaction of SiF$_4$ with alkali metal aluminum hydrides is not very pressure dependent.

The process is preferably carried out with agitation. Vigorous agitation improves contacting the reactants, favors the intended reaction, and diminishes side reactions which can complicate the process. Some side reactions might cause deleterious effects such as plugging, co-product purity problems, and the like.

Since the process is exothermic, evolved heat may be removed if desired by circulating the mixture through an external heat exchanger or by using an internal cooling coil or condensing a boiling solvent. Such expedients are more preferably used in conjunction with the primary, rather than the secondacry reactor.

EXAMPLE 2

Figure 3:
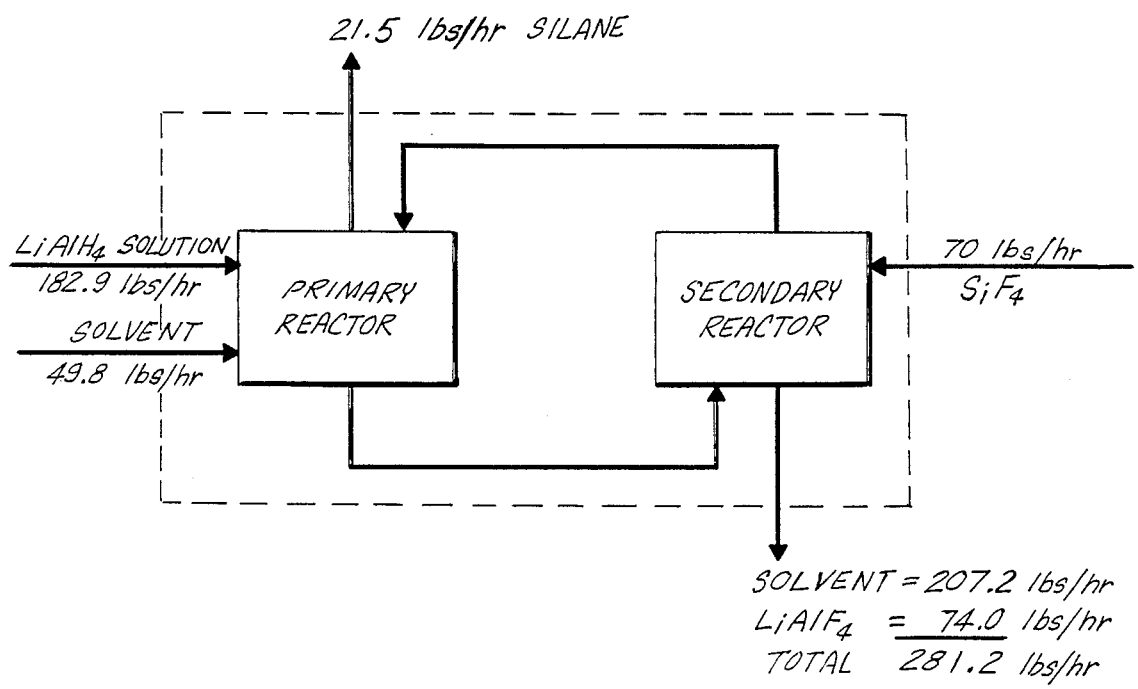
FIG. 3 is a schematic representation of an embodiment of this invention illustrated or exemplified by Example 2.

The process of this Example comprises the reaction of LiAlH$_4$ and SiF$_4$ to produce silane and a fluoride salt co-product containing lithium and aluminum. The process results are illustrated by FIG. 3. It is conducted similiarly to the process of Example 1 using the same size reactors as mentioned above. The solvent is DME, and the reaction temperature is similiar to that used in the first example. Calculations that further illustrate the process are as follows:

(I) Bases
SiF$_4$ feed rate and purity same as in Example 1.
LiAlH$_4$ 100% pure and introduced as a 14% solution reacted at 11% concentration.
98.5% of LiAlH$_4$ reacts in primary reactor, remainer reacts in secondary reactor.
Neglect dimethoxyethane (DME) decomposition and DME leaving with SiH$_4$.
Molecular weight:
LiAlH$_4$ = 38
LiAlF$_4$ = 110
SiF$_4$ = ~104
SiF$_4$ = ~32
(II) Calculation of Amount of LiAlH$_4$ reacted.

$= \frac{38}{104} \times 70 = 25.6$

= 25.6 lbs per hour or 11.6 kg/hr
In primary reactor; 25.6 × 0.985 = 25.2 lbs per hour or 11.5 kg/hr
In secondary reactor; 25.6 − 25.2 = 0.4 = 0.4 lbs per hour or 0.2 kg/hr As 14% solution $\frac{25.6}{0.14}$ = 182.9 lbs per hour or 83.1 kg/hr As 11% solution $\frac{25.6}{0.11}$ = 232.7 lbs per hour or 105.8 kg/hr Solvent present in 11% solution 232.7 − 25.6 = 207.1 lbs per hour or 94.1 kg/hr
(III) Amount of Diluent solution required
232.7 − 182.9 = 49.8 lbs per hour or 22.6 kg/hr
(IV) Amounts of products produced Amount of SiH$_4$ = $\frac{32}{104} \times 70.0$ = 21.5 lbs per hour or 9.8 kg/hr Amount of LiAlF$_4$ = $\frac{110}{104} \times 70$ = 74.0 lbs per hour or 33.7 kg/hr
From primary reactor, 74 × 0.985 = 72.9 lbs per hour or 33.1 kg/hr
(V) Amount of SiF$_4$ from Secondary reactor
70.0 × 0.985 = 69.0 lbs per hour or 31.3 kg/hr The process of this Example is also conducted (as the process of Example 1) using RTDs to measure the temperature inside the secondary reactor and upstream therefrom. The noted ΔT is used to generate a signal to govern the flow of SiF$_4$ to the secondary reactor. For this purpose a metal (platinum) film RTD is preferred over more simple constructions such as the "bird-cage" element commonly used in the laboratory. As well known by skilled practitioners the film RTD has increased resistance per given size, and since the device is relatively small, it can respond more quickly to changes in temperature. For better temperature measurement, the RTDs are used with a Wheatstone bridge, or preferably a 4-wire ohm measurement system to increase the accuracy of the temperature measurement. RTDs are more linear than thermocouples, but still require some curve fitting, as recognized by a skilled practitioner. The Callendar-Van Dusen equation can be used for curve fitting. Alternatively the 20th order polynomial can be used to provide a more accurate curve fit, as known in the art.

Following the procedure of the above example, KAlH$_4$, NaH, KH or LiH can be reacted with SiF$_4$ or SiCl$_4$. Also, LiAlH$_4$ and NaAlH$_4$ can be reacted with SiCl$_4$. Mixtures such as NaH and NaAlH$_4$ can also be used.

These reactions can be conducted using an ether reaction medium such as discussed above, and by reacting from about 90–99% of the metal hydride in the primary reactor and the remainder in the secondary reactor.

The process temperature is within the range of from 10°–65° C. and the processes are preferably conducted at atmos pheric pressure. When SiCl$_4$ is used as a liquid, the temperature is maintained below 59° C.

The RTDs used are exemplified by 100 ohm platinum RTOS, 24 inches long, ¼" O.D. 316 stainless steel sheath, 3 wire, 1 foot extension supplied by Child's Instruments. The silane product can be separated from the other materials by its difference in boiling point.

The process of this invention can be extended to other reactive systems, to produce stoichiometric or substantially stoichiometric operation. The process and loop arrangement of this invention can be utilized where it is desired to achieve a degree of stoichiometry, not otherwise readily attainable by use of a batch reactor or a single back mix reactor of economical size. For use with this invention, the reactants employed should react rapidly; preferably, an instantaneous or practically instantaneous reaction is used. Also, it is preferred that there not be competing reactive mechanisms which enable the reactants to combine in more than one way. If there are competing mechanisms, one should be very predominate, so that most if not all the reactants react by that mechanism when contacted under the reaction conditions employed.

The reactants employed should not give different product(s) depending on the relative concentration of the reactants in the reaction zone. The process must be sufficiently exothermic in order to enable the heat of reaction to be used to generate an adequate signal to (a) monitor the reaction, and (b) to provide the feedback necessary to rapidly alter the rate of feed of one or more reactants. Indicia other than heat, e.g. pH, might be useful in monitoring other reactions conducted according to this invention.

The products produced should be readily separable so that they can be removed from the loop. The product(s) formed are preferably not reactive with additional quantities of reactant(s) under the reaction conditions employed.

The process of this invention provides a means for preparing silane from metal hydrides. It is possible to vary certain aspects of the invention including the metal containing compound and silicon compound used as starting materials, the reaction media, and the configuration and type of equipment utilized in the process without departing from the scope and spirit of the invention as defined by the appended claims.

We claim:

1. A continuous method for preparing silane and a co-product comprising a metal and a halogen, said process comprising:
   (A) reacting in a first reaction zone and in a liquid reaction medium, a metal hydride selected from alkali metal hydrides and alkali metal aluminum hydrides, with less than a stoichiometric quantity of a silicone halide selected from compounds having the formula $SiX_4$, wherein X is fluorine, chlorine, or bromine;
   (B) reacting in a second reaction zone, metal hydride remaining in the liquid/solid reaction product produced by Step A with a quantity of $SiX_4$ in excess of that required to react with said remaining metal hydride;
   (C) separating in a separation zone, a gaseous fraction comprising silane and unreacted silicon halide from solid reaction product suspended in a diluting solution and produced in said reaction zones;
   (D) recovering said silane;
   (E) introducing unreacted silicon halide from said second reaction zone into said first reaction zone to react with an additional quantity of metal hydride;
   (F) determining the difference in temperature between the temperature of reaction liquid in said second reaction zone, and the temperature of reactant liquid substantially immediately prior to entry into said second zone; and
   (G) utilizing a signal derived from said difference in temperature (a) to monitor the reaction and (b) to provide the feedback necessary to alter the rate of feed of one or more reactants.

2. A process of claim 1 wherein said metal hydride is an alkali metal hydride wherein the alkali metal is selected from lithium, sodium, and potassium.

3. A process of claim 1 wherein said metal hydride is an alkali metal aluminum hydride wherein said alkali metal is selected from lithium, sodium and potassium.

4. A process of claim 1 wherein said silicon halide is selected from $SiF_4$ and $SiCl_4$.

5. A process for the preparation of silane, and a metal halide co-product said process comprising reacting an alkali metal aluminum hydride with a silicon tetrahalide, said process comprising:
   (I) introducing said alkali metal aluminum hydride and a liquid reaction medium at a substantially constant flow rate into a primary reaction zone, and reacting said hydride in said zone with less than a stoichiometric quantity of silicon halide, such that from about 90 to about 99 weight percent of the alkali metal aluminum hydride being introduced is reacted in said zone;
   (II) reacting alkali metal hydride from said first reaction zone in a second reaction zone, wherein silicon halide is introduced at a rate that is at least substantially stoichiometric with the amount of alkali metal aluminum hydride introduced into said first reaction zone;
   (III) in a separation zone, separating silane product and unreacted silicon halide introduced in said secondary reaction zone from a slurry comprising: (i) metal-aluminum-halogen containing co-product, and (ii) said liquid reaction medium;
   (IV) recovering said silane;
   (V) introducing unreacted silicon halide from said second reaction zone into said first reaction zone for reaction with additional alkali metal aluminum hydride introduced into said zone;
   (VI) determining the difference in temperature between the temperature of liquid reaction medium in said second reaction zone, and the temperature of reactant liquid medium, from said first reaction zone, substantially immediately prior to entry into said second zone; and
   (VII) utilizing a signal derived from said difference in temperature (a) to monitor the reaction and (b) to provide the feedback necessary to alter the rate of feed of one or more reactants.

6. A process of claim 5 wherein said alkali metal aluminium hydride is selected from $LiAlH_4$, $NaAlH_4$ and $KAlH_4$.

7. A process of claim 6 wherein said hydride is $LiAlH_4$.

8. A process of claim 6 wherein said hydride is $NaAlH_4$.

9. A process of claim 5 wherein said silicon halide is selected from $SiF_4$ and $SiCl_4$.

10. A process of claim 9 wherein said silicon halide is $SiF_4$.

11. A process of claim 5 being conducted in the presence of an ether as a liquid reaction medium.

12. A process of claim 5 wherein said ether is mixed with a hydrocarbon.

13. The process of claim 1, wherein reaction of metal hydride and silicon halide in steps A and B is conducted at a temperature of from about 10° to about 80° C.

14. The process of claim 6, wherein from about 90% to about 99% of the sodium aluminum hydride is reacted in the primary reaction zone.

15. The process of claim 11, wherein said ether is a di-loweralkyl ether of an alkylene glycol.

16. The process of claim 15, wherein said ether is dimethoxyethane.

17. The process of claim 12, wherein said ether is dimethoxyethane and said hydrocarbon is toluene.

* * * * *